United States Patent
Gallardo et al.

(10) Patent No.: US 9,760,417 B2
(45) Date of Patent: Sep. 12, 2017

(54) APPLICATION DEHYDRATION AND REHYDRATION DURING APPLICATION-TO-APPLICATION CALLS

(71) Applicant: Microsoft Corporation, Redmond, WA (US)

(72) Inventors: John E. Gallardo, Woodinville, WA (US); Arunjeet Singh, Redmond, WA (US); Abolade Gbadegesin, Redmond, WA (US); Sean M. McKenna, Seattle, WA (US); Akhilesh Kaza, Sammamish, WA (US); Andrew Clinick, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 14/322,647

(22) Filed: Jul. 2, 2014

(65) Prior Publication Data

US 2015/0254119 A1 Sep. 10, 2015

Related U.S. Application Data

(60) Provisional application No. 61/950,799, filed on Mar. 10, 2014.

(51) Int. Cl.
*G06F 9/54* (2006.01)
*G06F 9/50* (2006.01)
(Continued)

(52) U.S. Cl.
CPC ............ *G06F 9/547* (2013.01); *G06F 9/461* (2013.01); *G06F 9/4843* (2013.01);
(Continued)

(58) Field of Classification Search
CPC .............. G06F 9/547; G06F 12/023; G06F 2212/1044; G06F 9/461; G06F 9/5016; G06F 9/4843; G06F 2209/543
See application file for complete search history.

(56) References Cited

U.S. PATENT DOCUMENTS

2005/0268301 A1 12/2005 Kelley et al.
2008/0082693 A1 4/2008 Meijer et al.
(Continued)

OTHER PUBLICATIONS

"Dehydration and Rehydration" (author unknown), Microsoft Corporation, copyright 2004 (downloaded from https://msdn.microsoft.com/en-us/library/ee253540(v=bts.10).aspx , Mar. 21, 2016).*
(Continued)

*Primary Examiner* — Tuan Thai
*Assistant Examiner* — Glenn Gossage
(74) *Attorney, Agent, or Firm* — Fiala & Weaver P.L.L.C.

(57) ABSTRACT

Methods, systems, and computer program products are provided that enable a first application (i.e., a caller application) to call a second application (i.e., a callee application) to perform a function in a manner such that the first application may be dehydrated during the call. Dehydrating includes terminating execution of an instance of the first application, and freeing memory space in a memory of a mobile device that stored the instance of the first application. In such case, the second application may be active while the first application is no longer present in memory. The second application is enabled to respond to the call, causing the first application to be rehydrated. The first application continues execution at a location where the first application was dehydrated, and receives the response to the call.

20 Claims, 7 Drawing Sheets

(51) Int. Cl.
G06F 12/02 (2006.01)
G06F 9/46 (2006.01)
G06F 9/48 (2006.01)

(52) U.S. Cl.
CPC .......... *G06F 9/5016* (2013.01); *G06F 12/023* (2013.01); *G06F 2209/543* (2013.01); *G06F 2212/1044* (2013.01)

(56) References Cited

U.S. PATENT DOCUMENTS

| | | |
|---|---|---|
| 2009/0307661 A1 | 12/2009 | Vierzba et al. |
| 2011/0283291 A1* | 11/2011 | Tobe ..................... G06F 9/5022 718/104 |
| 2012/0151446 A1* | 6/2012 | Sathya ................ G06F 11/3656 717/125 |
| 2012/0198472 A1* | 8/2012 | Liu .......................... G06F 9/461 718/108 |
| 2012/0210321 A1 | 8/2012 | Silva et al. |
| 2012/0324197 A1 | 12/2012 | Spradlin et al. |
| 2013/0031490 A1 | 1/2013 | Joo et al. |
| 2013/0074082 A1* | 3/2013 | Yu ........................... G06F 9/485 718/102 |
| 2013/0332846 A1 | 12/2013 | Freedman et al. |
| 2013/0332940 A1 | 12/2013 | Hackborn et al. |
| 2014/0007140 A1* | 1/2014 | Hall .................... G06F 9/44505 719/328 |

OTHER PUBLICATIONS

Sinofsky, Steven, "Reducing runtime memory in Windows 8", Published on: Oct. 7, 2011, Available at: http://blogs.msdn.com/b/b8/archive/2011/10/09/10218369.aspx, 45 pages.

"State Preservation and Restoration", Published on: Oct. 22, 2012, Available at: https://developer.apple.com/library/ios/documentation/iPhone/Conceptual/iPhoneOSProgrammingGuide/StatePreservation/StatePreservation.html#//apple_ref/doc/uid/TP40007072-CH11-SW13, 17 pages.

"Fast App Resume for Windows Phone 8", Published on: Feb. 3, 2014, Available at: http://msdn.microsoft.com/en-us/library/windowsphone/develop/jj735579(v=vs.105).aspx, 8 pages.

"Managing Your App's Memory", Published on: Feb. 1, 2014, Available at: http://developer.android.com/training/articles/memory.html, 8 pages.

International Search Report & Written Opinion Issued in PCT Patent Application No. PCT/US2015/017891, dated May 15, 2015, 11 Pages.

International Preliminary Report on Patentability Issued in PCT Application No. PCT/US2015/017891, dated Dec. 16, 2015, 6 Pages.

* cited by examiner

APPLICATION DEHYDRATION AND REHYDRATION DURING APPLICATION-TO-APPLICATION CALLS

CROSS REFERENCE TO RELATED APPLICATIONS

This application claims the benefit of U.S. Provisional Application No. 61/950,799, filed on Mar. 10, 2014, which is incorporated by reference herein in its entirety.

BACKGROUND

Many types of mobile devices exist, such as smart phones and tablet computers. Such devices are hand-carriable, and therefore provide a great deal of convenience for users. Furthermore, many mobile devices are capable of running numerous programs or applications (e.g., "Apps") simultaneously to perform a variety of functions. Mobile devices, particularly low end mobile devices, are severely challenged by multi-tasking scenarios, however. This is in part due to the effort to keep the cost associated with mobile devices low in order to be competitive at scale, which leads to the use of low end or low powered parts. Because memory (e.g., random access memory or "RAM"), tends to be expensive, relatively smaller capacity memory devices tend to be used in mobile devices to reduce costs.

In the past where the memory capacity of mobile devices was not as much of a problem, there were situations where a first application A may invoke a second application B to retrieve some data. After the data retrieval operation, both of the applications A and B would be left residing in the memory of the mobile device, even if one or both of them were no longer needed, leading them to continue to consume a portion of the memory resource. This type of cycle would sometimes continue, leading to further numbers of applications unnecessarily remaining in and consuming the memory. Large memory modules and paging together lend themselves to allow for deeply nested scenarios of applications invoking other applications. Something as simple as a third party application that uses Facebook® (operated by Facebook, Inc. of Palo Alto, Calif.) as a picture provider may lead to three applications residing in memory concurrently. This accumulation of applications in memory can create a memory problem for low end devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable a first application (i.e., a caller application) to call a second application (i.e., a callee application) to perform a function in a manner such that the first application may be dehydrated during the call. In such case, the second application may be active while the first application is no longer present. The second application is enabled to respond to the call, causing the first application to be rehydrated. The first application continues execution at a program location where the first application was dehydrated, and receives the response to the call.

For instance, in one implementation, a method in a mobile device is provided that includes: receiving a call issued from a first application contained by the mobile device that is directed to a second application, the call including continuation data for the first application and request information; dehydrating the first application; and providing the request information to the second application.

The method may further include: receiving response information from the second application in response to the request information; rehydrating the first application based on the continuation data; and providing the response information to the first application.

In one aspect of the method, the providing of the request information to the second application may include: invoking the second application in the mobile device; and providing the request information to the second application. Furthermore, the receiving of the response information from the second application in response to the request information may lead to the terminating the second application.

In a further aspect of the method, the method may further include: maintaining an application list that includes one or more entries, each entry of the application list indicating an application identifier for a corresponding application and an application instance identifier that identifies a particular instance of the corresponding application; and in response to receiving the call issued from or by the first application, tagging an entry in the application list with the continuation data, the tagged entry corresponding to the instance of the first application that issued the call.

Furthermore, the rehydrating of the first application based on the continuation data may include: identifying the entry in the application list for the instance of the first application in response to receiving the response information; and using the continuation data tagged to the identified entry in the application list to rehydrate the first application.

In an alternative aspect, the method may include receiving an indication that a user interacted with a user interface of the mobile device to attempt to re-launch the first application prior to a response being received from the second application to the provided request information; re-launching the first application at an entry point for the first application that is different than an entry point identified by the continuation data (e.g., a "main" entry point); and discarding the continuation data.

In another implementation, a mobile device is provided. The system includes a broker process configured to execute in a processor circuit of the mobile device. The broker process includes a call broker and a hydration enabler module. The call broker is configured to receive a call issued from an instance of a first application that executes in the mobile device. The call is directed to a second application and includes continuation data for the instance of the first application and request information. The call broker is further configured to provide the request information to the second application without the continuation data. The hydration enabler module is configured to provide a first signal to enable the instance of the first application to be dehydrated. The call broker is further configured to receive response information from the second application in response to the request information. The hydration enable module is configured to cause the instance of the first application to be rehydrated based on the continuation data. The call broker is further configured to provide the response information to the instance of the first application.

In a further aspect, the call broker may be configured to cause the second application to be invoked in the mobile device, and to provide the request information to the invoked second application. Furthermore, the call broker may be configured to cause the second application to be terminated in response to receipt of the response information from the second application.

Memory space of a primary memory that was allocated to the instance of the first application is freed when the instance of the first application is dehydrated. Furthermore, memory space in the primary memory is reallocated to the instance of the first application and the first application is re-launched at an entry point identified by the continuation data when the instance of the first application is rehydrated based on the continuation data.

In a further aspect, the system may also include a foreground manager. The foreground manager is configured to maintain an application list that includes one or more entries. Each entry of the application list indicates an application identifier for a corresponding application and an application instance identifier that identifies a particular instance of the corresponding application. The call broker may be configured to tag an entry in the application list with the continuation data in response to receiving the call issued by the first application. The tagged entry corresponds to the instance of the first application that issued the call.

Furthermore, in response to receiving response information regarding the call from the second application, the call broker may be configured to identify the entry in the application list for the instance of the first application, and to use the continuation data tagged to the identified entry in the application list to rehydrate the first application.

A computer readable storage medium is also disclosed herein having computer program instructions stored therein that enable a caller application to be dehydrated while a call issued by the caller application to a callee application is processed, and to rehydrate the caller application when the call is complete, as well as enabling further embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
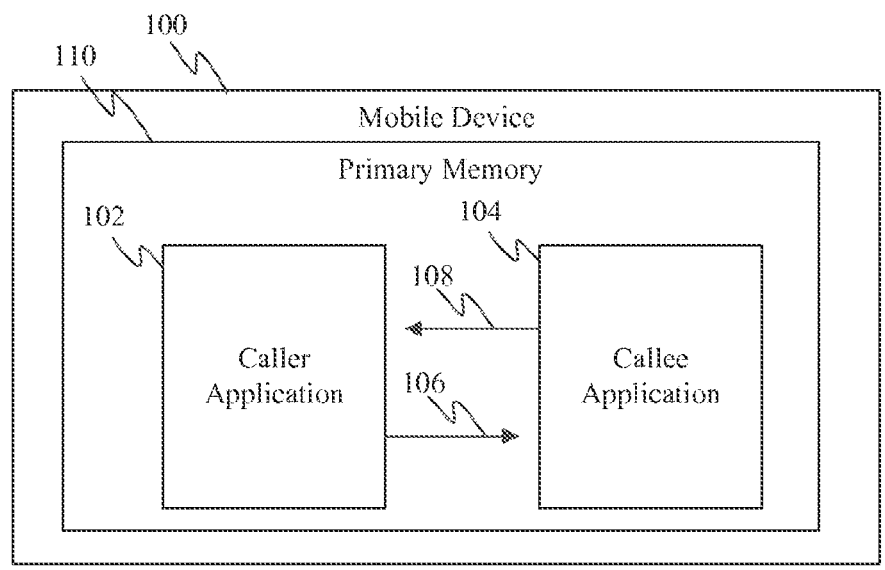
FIG. 1 shows a block diagram of a mobile device in which a caller application issues a call to a callee application, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Exemplary Embodiments

Embodiments described herein enable a first application (i.e., a caller application) to call a second application (i.e., a callee application) to perform a function in a manner such that the first application may be dehydrated during the call. In such case, the second application may be active while the first application is no longer present. The second application is enabled to respond to the call, causing the first application to be rehydrated. The first application is re-invoked and continues execution at a location where the first application was dehydrated, and receives the response to the call. Mechanisms are disclosed to pass simple state information for the first application through communications such as URI (uniform resource indicators), and to pass more complex state through service entities across these boundaries. These techniques may be implemented in association with public contracts that participating entities may opt into and make sure their applications are configured to participate with.

For instance, FIG. 1 shows a block diagram of a mobile device 100, according to an example embodiment. As shown in FIG. 1, mobile device 100 includes a caller application 102 and a callee application 104 residing in a primary memory 110 of mobile device 100. For ease of illustration, many more features that may be included in mobile device 100 are not shown in FIG. 1, and at least some of such features may be described elsewhere herein. Mobile device 100 is described as follows.

Mobile device 100 may be any type of mobile computing device, including a mobile computer or mobile computing device (e.g., a Microsoft® Surface® device, a personal digital assistant (PDA), a laptop computer, a notebook computer, a tablet computer such as an Apple® iPad™, a netbook, etc.), a mobile phone (e.g., a cell phone, a smart phone such as a Microsoft® Windows® phone, an Apple® iPhone®, a phone implementing the Google® Android™ operating system, a Palm® device, a Blackberry® device, etc.), a wearable computing device (e.g., a smart watch, a head-mounted device including smart glasses such as Google® Glass™ etc.), a digital camera, or other type of mobile device.

Mobile device 100 may include a network interface that enables mobile device 100 to communicate over one or more networks. Example networks include a local area network (LAN), a wide area network (WAN), a personal area network (PAN), and/or a combination of communication networks, such as the Internet. One or more of any type of network interface may be present, wired or wireless, including a network interface card (NIC), an Institute of Electrical and Electronics Engineers (IEEE) 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

Primary memory 110 (or "main memory" etc.) of mobile device 100 includes one or more physical hardware memory devices accessible by one or more processors of mobile device 100. Such memory devices may be integrated in or separate from the processor(s). Primary memory 110 typically is used to store, among other things, applications of mobile device 100 that are open and executing. Such applications may typically be stored in secondary storage of mobile device 100 when not open and executing. Secondary storage is considered long term, persistent storage of mobile device 100. Applications stored in secondary storage may be copied from secondary storage to primary memory 110 when invoked for execution. A copy of an application that has been copied into primary memory 110 may be considered an "instance" of the applications. A single application stored in secondary memory may have one or more instances of the application that are copied into primary memory 110 and executing in mobile device 100 at any one time. When an instance of an application is closed, so that the application instance no longer to be executed, the memory space used by the application instance in primary memory 110 may be freed up to be used by other applications and/or other resources.

Caller application 102 and callee application 104 may each be any type of application capable of running on a mobile device, including at least some desktop applications as well as mobile applications that may be referred to as "Mobile Apps" or just "Apps." Examples of such mobile applications include email applications, calendar applications, word processing applications, database management applications, contacts management applications, stock market applications, news applications, weather applications, games, factory automation applications, mapping and location-based services applications, banking applications, order-tracking applications, ticket purchasing applications, mobile medical applications, social networking applications, photo management applications, music management applications, video management applications, etc. Such applications may be configured to communicate with network-based or "cloud"-based services (e.g., at servers) for file access, file storage, information access, etc., to assist with performance of application functions.

Figure 2:
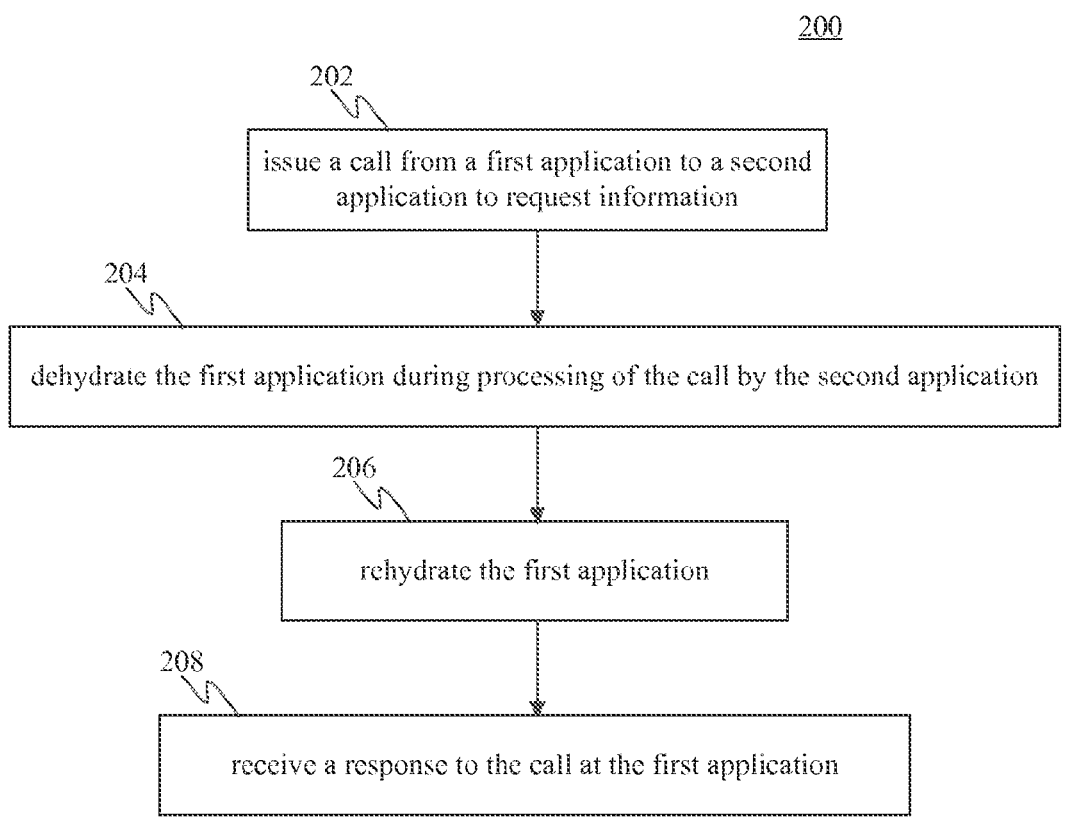
FIG. 2 shows a flowchart providing a process for enabling an application to be dehydrated upon issuing an application-to-application call, and to be rehydrated when the call is completed, according to an example embodiment.

According to embodiments, caller application 102 and callee application 104 may communicate to handle a call issued by caller application 102 in a manner such that caller application 102 does not need to reside in primary memory 110 during the entire time the call is processed. Such embodiments may be performed in various ways. For instance, FIG. 2 shows a flowchart 200 providing a process for enabling an application to be dehydrated upon issuing an application-to-application call, and to be rehydrated when the call is completed, according to an example embodiment. Flowchart 200 is described as follows with respect to mobile device 100 of FIG. 1. Further structural and operational embodiments will be apparent to persons skilled in the relevant art(s) based on the following description.

Flowchart 200 begins with step 202. In step 202, a call is issued from a first application to a second application to request information. For example, as shown in FIG. 1, caller application 102 may issue a call 106 to callee application 104. Call 106 is an application-to-application call that requests information. For instance, call 106 may include a request for a file (e.g., a document, an image, or other object) from callee application 104 and/or a request for callee application 104 to perform a function and provide return data and/or an acknowledgment that the function was performed. Call 106 may be issued in any suitable form, including in serialized or non-serialized form.

Figure 3:
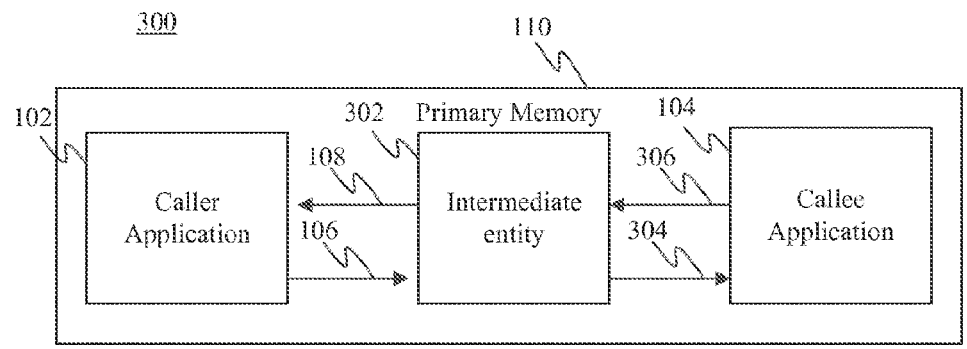
FIG. 3 shows a block diagram of a mobile device in which a caller application issues a call to a callee application via an intermediate entity, according to an example embodiment.

In one embodiment, call 106 may be provided from caller application 102 to callee application 104 directly. In another embodiment, call 106 may be provided from caller application 102 to callee application 104 through an intermediate entity in mobile device 100. For example, FIG. 3 shows a block diagram of a mobile device 300 in which caller application 102 issues a call to callee application 104 via an intermediate entity 302, according to an example embodiment. Mobile device 300 is an example of mobile device 100 of FIG. 1. As shown in FIG. 3, caller application 102 issues call 106. In the example of FIG. 3, call 106 is received by intermediate entity 302. Intermediate entity 302 may be any suitable intermediary entity for calls that operates in mobile device 300, including an operating system entity such as a broker or other entity. Intermediate entity 302 may extract request information from call 106 to be used by callee application 104 to service call 106, and may forward that extracted request information to callee application 104 in forwarded call information 304.

As such, callee application 104 either receives call 106 (FIG. 1) directly from caller application 102, or receives forwarded call information 304 from intermediate entity 302 (FIG. 3). In either case, callee application 104 processes the call based on the received call information.

Referring back to FIG. 2, in step 204, the first application is dehydrated during processing of the call by the second application. In an embodiment, caller application 102 may be dehydrated during the processing of call 106. Dehydration of caller application 102 entails shutting down execution of the instance of caller application 102 that issued call 106, and freeing up the memory space of primary memory 110 that stored that instance of caller application 102. In this manner, memory space in primary memory 110 is conserved. In one embodiment, the executing instance of caller application 102 may be dehydrated, and callee application 104 may subsequently be invoked to service call 106, such that the instance of caller application 102 and the invoked instance of callee application 104 do not reside in primary memory 110 at the same time, conserving memory space of primary memory 110 even further.

In step 206, the first application is rehydrated. In an embodiment, caller application 102 may be rehydrated after call 106 is processed by callee application 104. Rehydration of caller application 102 entails invoking an instance of caller application 102, such that the invoked instance of caller application 102 resides in memory space of primary memory 110. In this manner, memory space in primary memory 110 was conserved during at least a portion of the time that callee application 104 processed call 106. In one embodiment, callee application 104 may be terminated, such that execution of the responding instance of callee application 104 is shutdown, and the memory space of primary memory 110 of that instance of callee application 104 is freed, and caller application 102 may subsequently be rehydrated. In this manner, the invoked instance of caller application 102 and the terminated instance of callee application 104 do not necessarily reside in primary memory 110 at the same time, conserving memory space of primary memory 110 even further.

In step 208, a response to the call is received at the first application. As shown in FIG. 1, callee application 104 generates and provides call response 108 in response to call 106. For instance, call response 108 may include a requested file, requested information, return data, etc., provided in response to call 106. Call response 108 may be received by caller application 102 directly from callee application 104. Alternatively, such as according to the embodiment of FIG. 3, call response 108 may be provided from callee application 104 through an intermediate entity in mobile device 100. For example, FIG. 3 shows callee application 104 having generated response information 306. Response information 306 may include the requested file, requested information, return data, etc. Response information 306 is received from callee application 104 by intermediate entity 302. Intermediate entity 302 may identify caller application 102 as the intended recipient of response information 306, and may forward response information 306 to caller application 102 in call response 108.

In an embodiment, intermediate entity 302 may generate call response 108 to include state information provided by caller application 102 in call 106. The state information may indicate a state of operation of caller application 102 when call 106 was issued, and thus, when received by caller application 102 in call response 108, may enable caller application 102 to continue operating from the point when call 106 was issued. For instance, an instance of caller application 102 may be rehydrated, and may use the state information to continue operation at an entry point of caller application 102 indicated in the state information. The state information that enables caller application 102 to continue operating at a particular entry point may be referred to as "continuation data." Caller application 102 may have any number of entry points that are predefined, and operation may be continued (e.g., from rehydration) at any of them based on the appropriate continuation data.

Note that in some embodiments, after rehydration of caller application 102, continuation data may be applied with global state information (that is maintained elsewhere by an operating system of mobile device 102) to caller application 102 to enable caller application 102 to continue operating at the entry point indicated by the continuation data.

Figure 4:
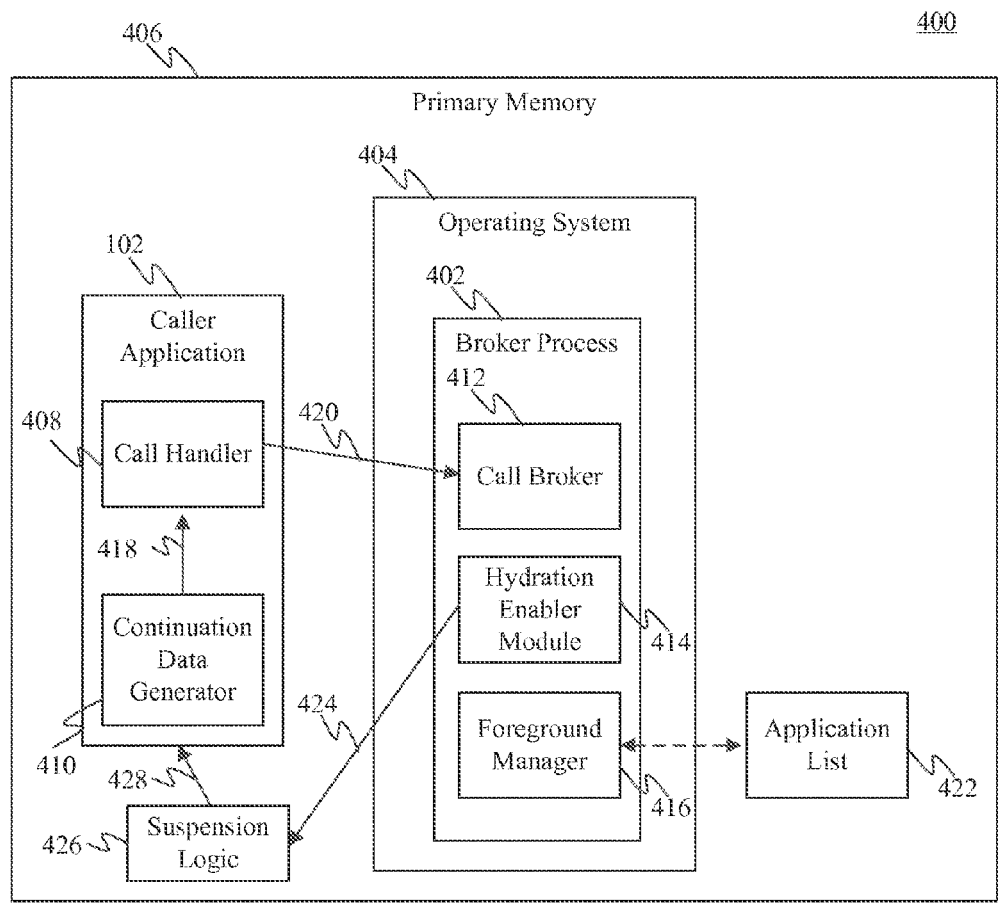
FIG. 4 shows a block diagram of a mobile device in which a caller application issues a call that is received by a broker process, according to an example embodiment.

Mobile devices may be configured in various ways to enable dehydration and rehydration of caller applications according to embodiments. For instance, FIG. 4 shows a block diagram of a mobile device 400 issuing an application-to-application call that is handled by an intermediate entity, according to an example embodiment. Mobile device 400 is an example of mobile device 300 of FIG. 3. As shown in FIG. 4, mobile device 400 includes a primary memory 406. Primary memory 406 is an example of primary memory 110 (FIG. 3). Furthermore, primary memory 406 stores caller application 102, an operating system 404 that includes a broker process 402, and suspension logic 426. Although suspension logic 426 is shown as being independent of operating system 404 in FIG. 4, in an embodiment, suspension logic 426 may be included in operating system 404. Still further, caller application 102 includes a call handler 408 and a continuation data generator 410, and broker process 402 includes a call broker 412, a hydration enabler module 414, and a foreground manager 416. In embodiments, foreground manager 416 may be included in broker process 402 as shown in FIG. 4, or may be external to broker process 402. Furthermore, in an embodiment, suspension logic 426 may be included in foreground manager 416.

Figure 5:
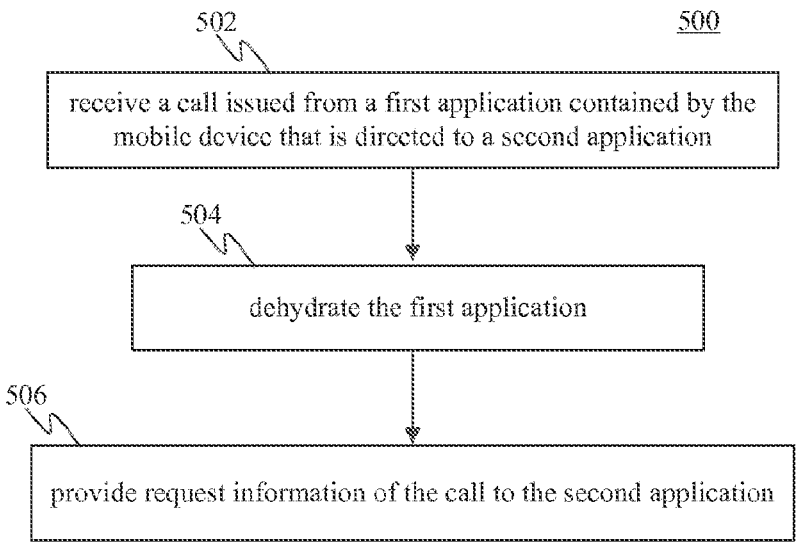
FIG. 5 shows a flowchart providing a process in a broker process for processing a call to a second application received from a first application, according to an example embodiment.
Figure 6:
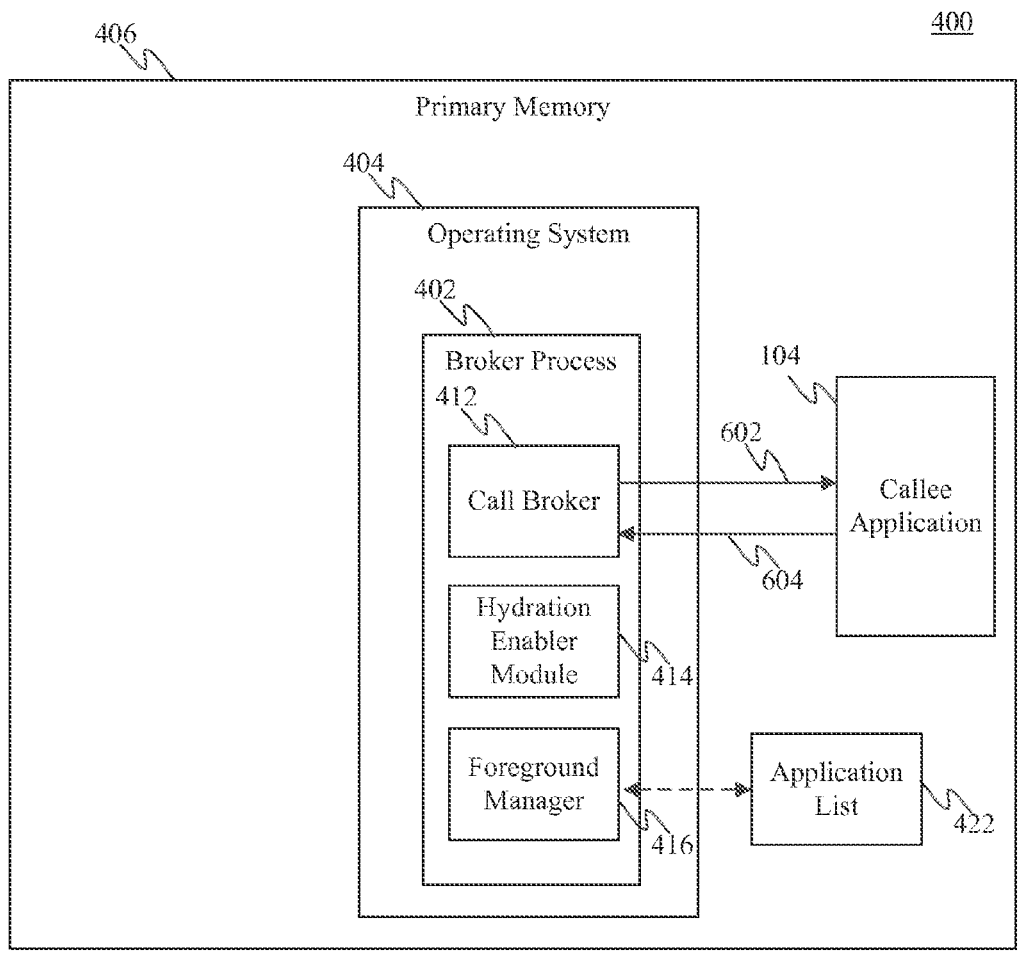
FIG. 6 shows a block diagram of the mobile device of FIG. 4 in which the caller application is dehydrated, and the broker process interacts with a callee application to handle the call, according to an example embodiment.

Mobile device 400 is described as follows with respect to FIGS. 5-14. FIGS. 6 and 11 show mobile device 400 during subsequent processing of the call shown issued in FIG. 4, according to example embodiments. FIGS. 5, 7-10, and 12-14 show example flowcharts providing processes related to the processing of an application-to application call, according to embodiments.

FIG. 4 is described with respect to FIG. 5 as follows. FIG. 5 shows a flowchart 500 providing a process in a broker process for processing a call received from a first application that is directed to a second application, according to an example embodiment. For example, in an embodiment, flowchart 500 may performed by broker process 402 shown in FIG. 4. Further structural and operational embodiments will be apparent to persons skilled in the relevant art(s) based on the following description of flowchart 500.

Flowchart 500 begins with step 502. In step 502, a call issued from a first application contained by a mobile device is received that is directed to a second application. For example, as shown in FIG. 4, call handler 408 of caller application 102 may issue a call 420. Call 420 is an example of call 106 of FIG. 1. Call handler 408 is configured to manage the issuing of calls, and the receiving of call responses, for caller application 102. Call handler 408 may issue calls in various ways, including ways known to persons skilled in the relevant art(s). For example, call handler 408 may generate call 420 in the form of a uniform resource indicator (URI), a system call, and/or another form.

Furthermore, call handler 408 may generate call 420 to include request information. The request information defines the purpose of call 420 by indicating what information and/or response is desired from the callee application. For instance, the request information may define one or more requested files or other objects from the callee application, a function to be performed by the callee application (e.g., open a file picker interface so that the user can select a file), data desired from the called application, etc.

Still further, as shown in FIG. 4, continuation data generator 410 may generate continuation data 418 that is received by call handler 408, and included by call handler 408 in call 420. Continuation data generator 410 is configured to generate continuation data 418 to include data that defines a current state of caller application 102. Continuation data 418 may include data in any suitable form, including a key-value structure, etc. Continuation data 418 may be received by caller application 102, and used by caller application 102 to continue operation at a point where call 420 is issued from caller application 102. For instance, continuation data 418 may be provided to an instance of caller application 102 that is rehydrated after call 420 is processed by the callee application. This enables the rehydrated instance of caller application 102 to continue operating at the entry point at which caller application 102 operated when call 420 was issued.

For instance, in one illustrative example, caller application 102 may be a social networking application (e.g., Facebook® operated by Facebook, Inc. of Palo Alto, Calif., Google+™ operated by Google, Inc. of Mountain View, Calif., etc.) that has multiple points where a photo may be requested from a photo manager application. In turn, the photo manager application may invoke a storage application that actually stores at least some photos (e.g., Dropbox™ operated by Dropbox, Inc. of San Francisco, Calif., etc.). Accordingly, when a user interacts with the social network application, two or even three applications may be involved (e.g., social networking application, photo manager application, and storage application).

The social networking application may have multiple entry points in its program code. For example, at a first point in the social networking application, a user may be enabled to interact with the social network application to select a photo (also referred to as an "image") from a photo manager application to include in their profile (a profile photo update point). At a second point, the user may be enabled to interact with the social network application to select a photo to include in their personal timeline (a timeline update point). At further points, the user may be enabled to select photos for other purposes. As such, the social networking application may have multiple points where a call may be issued to a photo manager application to request an image. Each of these points may be considered "entry points" at which the social network application may enter back into operation upon completion of the call that requests the image from the photo manager application, particularly if the social network application is dehydrated upon issuance of the call, and is rehydrated upon completion of the call. The social networking application may be rehydrated and continued at a first entry point, where a profile image was selected, at a second entry point, where a timeline image was selected, or at another entry point, depending on where the image was requested. Continuation data 418 enables the continuation of operation to occur at the particular entry point by recording the entry point for this subsequent use.

Continuation data 418 may include various information to enable operation continuation for caller application 102, including an identification of the entry point of caller application 102 at which call 420 is issued, a contract identifier of a contract between participating entities, an identification of the requested file or other object, an identification of the callee application to which call 420 is being issued, requested information, return data, etc., an identifier for caller application 102 (e.g., an "application identifier") that may be a numerical, alphanumerical, or other form of identifier, an instance identifier for the instance of caller application 102 that is executing and issued call 420 (an "application instance identifier") that may be a numerical, alphanumerical, or other form of identifier, further state information that identifies a state of caller application 102 when call 420 is issued, and/or further information.

As shown in FIG. 4, call broker 412 of broker process 402 receives call 420. Call 420, including continuation data 418, may be provided in a serialized or non-serialized form by call handler 408. Serialization (converting data to a serialized form) refers to translating the data to a form that can be stored and/or transmitted, and that can be subsequently reconstructed. Broker process 402 may be one or more processes of operating system 404. Operating system 404 is an operating system of mobile device 400, and may be resident in primary memory 406 of mobile device 400 during operation of mobile device 400. Call broker 412 of broker process 402 is configured to broker calls issued between applications of mobile device 400, including being capable of receiving calls from caller applications, and forwarding information of the received calls to the corresponding callee applications, as well as being capable of receiving call response information from callee applications, and forwarding the response information to the corresponding caller applications. For instance, in an embodiment, call broker 412 may be implemented as an application programming interface (API) (e.g., expressed as a set of classes with an associated set of class methods), or in another form, to define how caller and callee application can interact with broker process 402 to send and receive call-related information. In other embodiments, call broker 412 may be implemented in other ways.

In an embodiment, foreground manager 416 may be present to track continuation data 418 received in call 420. For instance, broker process 412 may receive call 420, and extract and provide continuation data 418 to foreground manager 416 to store in an application list 422. Application list 422 is a data structure (e.g., a table, a database, an array, etc.) that stores a list of applications that may be executing in mobile device 400. For instance, the list may include a plurality of entries, with each entry corresponding to a particular instance of an application, whether the instance is actually executing or has been dehydrated (so may not be currently running, but may be rehydrated in the future to be running). In an embodiment, foreground manager 416 may store in or otherwise associate continuation data 418 in application list 422 with the instance of caller application 102 that issued call 420. In this manner, continuation data 418 may subsequently be used to continue caller application 102 after call 420 is processed.

Figure 7:
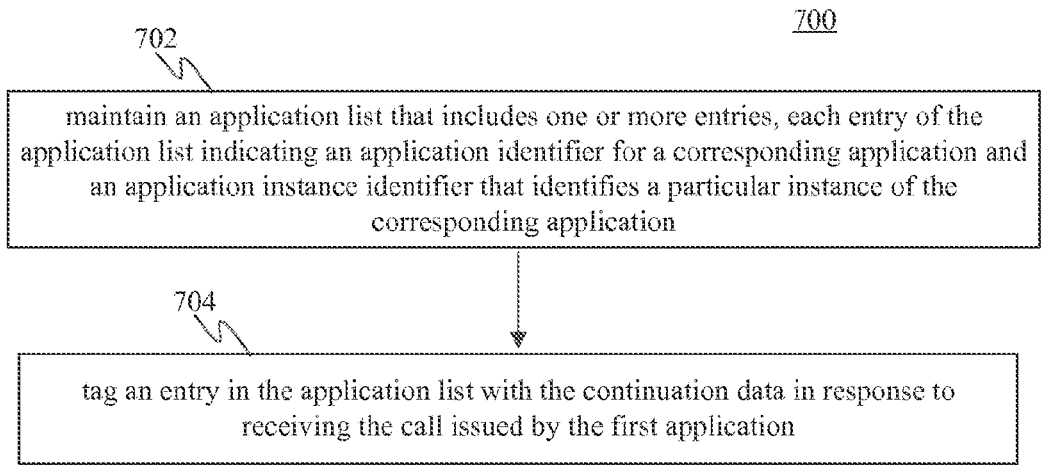
FIG. 7 shows a flowchart providing a process for tracking a call for a first application using an application list, according to an example embodiment.

For instance, in an embodiment, foreground manager 416 may operate according to FIG. 7. FIG. 7 shows a flowchart 700 providing a process for tracking a call for a first application using an application list, according to an example embodiment. Further structural and operational embodiments will be apparent to persons skilled in the relevant art(s) based on the following description of flowchart 700.

Flowchart 700 begins with step 702. In step 702, an application list is maintained that includes one or more entries, each entry of the application list indicating an application identifier for a corresponding application and an application instance identifier that identifies a particular instance of the corresponding application. For instance, as described above, foreground manager 416 may maintain application list 422, which contains one or more entries that each correspond to an executing application instance.

In one embodiment, each entry of application list 422 may indicate an application identifier for a corresponding application and an application instance identifier that identifies a particular instance of the corresponding application. For instance, application list 422 may include a plurality of entries that are each similar to the following example entry:

[ApplicationIdentifier],[ApplicationInstanceIdentifier]
where
[ApplicationIdentifier]=an application identifier for an application, and
[ApplicationInstanceIdentifier]=an identifier of an executing instance of the application identified by [ApplicationIdentifier].

In one embodiment, [ApplicationIdentifier] may be identified as an "AUMID" (Application User Model ID) as utilized in the Microsoft® Windows® Store. In such an example, [ApplicationIdentifier] may be composed of a package family name portion, followed by an exclamation point, followed by an application ID. For instance, an example AUMID is illustrated below:

SampleApplicationPackageName!SampleApplicationID
where
SampleApplicationPackageName=the package family name portion, and
SampleApplicationID=the application ID.

In other embodiments, application list 422 may identify application instances in other manners.

Referring back to FIG. 7, in step 702, an entry in the application list is tagged with the continuation data in response to receiving the call issued by the first application. In an embodiment, when foreground manager 416 receives continuation data 418 from a received call 420, foreground manager 416 is configured to associate the received continuation data 418 with an entry in application list 422 for the instance of caller application 102 having issued call 420.

In one embodiment, call 420 may identify the instance of caller application 102. Alternatively, call 420 may not identify the instance of caller application 102. In such a situation, call broker 412 may be configured to determine the instance of caller application 102 that issued call 420, and may provide the application instance identifier for the identified instance to foreground manager 416.

Call broker 412 may identify the instance of caller application 102 in any manner. For instance, in one example provided for illustrative purposes, call broker 412 may identify a UI (user interface) thread, also known as an ASTA (Application Single-Threaded Apartment), in which a UI for caller application 102 runs. When call 420 is received from caller application 102, call broker 412 may identify the ASTA associated with caller application 102. A one-to-one correspondence between the ASTA associated with caller application 102 is stored in operating system 402. Accordingly, call broker 412 may determine the application instance identifier for caller application 102 from the ASTA determined from call 420.

Once the application instance identifier for caller application 102 is identified, foreground manager 416 may tag (e.g., associate) the entry in application list 422 containing the identified application instance identifier with continuation data 418. Foreground manager 416 may store the continuation data 418 in application list 422 in association with the determined entry, or may tag the entry with the continuation data 418 in any other manner.

Referring back to flowchart 500 in FIG. 5, in step 504, the first application is dehydrated. In an embodiment, after receiving call 420, broker process 402 may cause caller application 102 to be dehydrated. For instance, this may be performed to save device resources (e.g., reduce memory consumption) while call 420 is being processed. In such an embodiment, call broker 412 may notify hydration enabler module 414 that call 420 has been received. In response, hydration enabler module 414 may cause caller application 102 to be dehydrated. For example, in an embodiment, hydration enabler module 414 may issue a dehydration request 424 (see FIG. 4), which is configured to cause caller application 102 to be dehydrated.

In one embodiment, dehydration request 424 may be directed to and received directly by caller application 102. In response, caller application 102 may be configured to enact a shutdown process. In another embodiment, dehydration request 424 may be directed to suspension logic 426. Suspension logic 426 may be configured to handle the dehydration of applications, including caller application 102. For instance, as shown in FIG. 4, suspension logic 426 may generate a shutdown instruction 428 that is received by caller application 102. In response, caller application 102 may be configured to enact a shutdown process.

Figure 8:
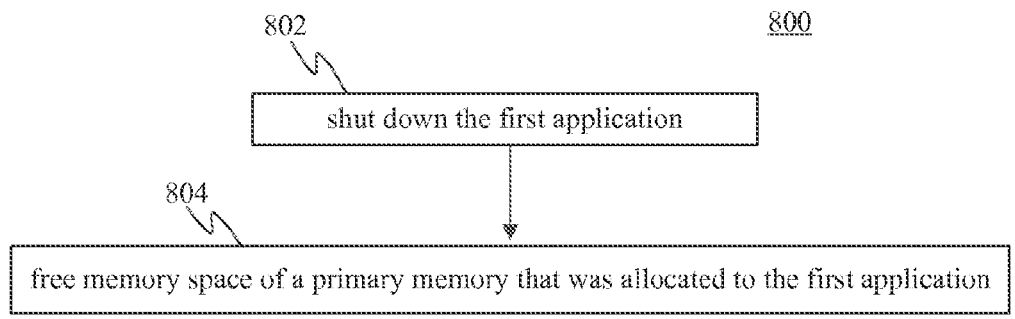
FIG. 8 shows a flowchart providing a process for dehydrating a caller application, according to an example embodiment.

In an embodiment, step 504 of FIG. 5 may include the process shown in FIG. 8. FIG. 8 shows a flowchart 800 providing a process for dehydrating a caller application, according to an example embodiment. Further structural and operational embodiments will be apparent to persons skilled in the relevant art(s) based on the following description of flowchart 800.

Flowchart 800 begins with step 802. In step 802, the first application is shut down. For example, as described above, hydration enabler module 414 may issue a dehydration request 424, which is configured to cause caller application 102 to be dehydrated. Caller application 102 may receive dehydration request 424 or shut down instruction 428 (from suspension logic 426), and may accordingly perform a shutdown process where caller application 102 terminates execution.

In step 804, memory space of a primary memory that was allocated to the first application is freed. In an embodiment, memory space of primary memory 406 that was allocated to caller application 102 may be freed now that caller application 102 has terminated execution. In embodiments, hydration enabler module 414 or suspension logic 426 may notify a memory manager (not shown in FIG. 4) of mobile device 400 that manages memory space in primary memory 406. As a result, the memory manager may open up or free the memory space that was allocated to caller application 102 in primary memory 406 to be used by other applications and/or resources.

As a result of dehydration, caller application 102 no longer resides in primary memory 406. For instance, FIG. 6 shows a block diagram of mobile device 400 in which caller application 102 has been dehydrated and therefore is not shown in primary memory 406, according to an example embodiment.

Note that in an embodiment, such dehydrating of caller application 102 may be performed selectively. For instance, in some cases, caller application 102 may be dehydrated, and in other cases, caller application 102 may be allowed to remain in primary memory 406 in some situations. For example, if mobile device 400 has a sufficiently large amount of memory (e.g., mobile device 400 is a "high end" device), caller application 102 may be allowed to remain in primary memory 406 during processing of call 420. Broker process 402 may be configured to selectively dehydrate caller application 102 in various circumstances, such as when primary memory 406 is filled to a predetermined threshold amount (and some freeing up of primary memory 406 is desirable), when a predetermined number of applications are running in mobile device 400 (e.g., above a threshold number of applications), and/or based on another trigger.

Referring back to flowchart 500 in FIG. 5, in step 506, the request information is provided to the second application. For example, with continued reference to FIG. 6, call broker 412 provides request information 602 to callee application 104. Request information 602 includes request information that was received from caller application 102 in call 420. In an embodiment, however, request information 602 does not include continuation data 418 (FIG. 4). This is because callee application 104 is not concerned with the state of caller application 102 (e.g., whether caller application 102 is dehydrated or hydrated), and thus does not need any state information of caller application 102, including continuation data 418. Accordingly, callee application 104 processes request information 602 to fulfill the request, such as retrieving one or more requested files or objects, retrieving and/or determining requested information or return data, etc.

Note that in one embodiment, callee application 104 may already be executing and present in primary memory 406 when call 420 is issued by caller application 102. In another embodiment, callee application 104 may not be executing or be present in primary memory 406 when call 420 is issued by caller application 102. In such a case, callee application 104 needs to be invoked in order to receive and respond to request information 602.

Figure 9:
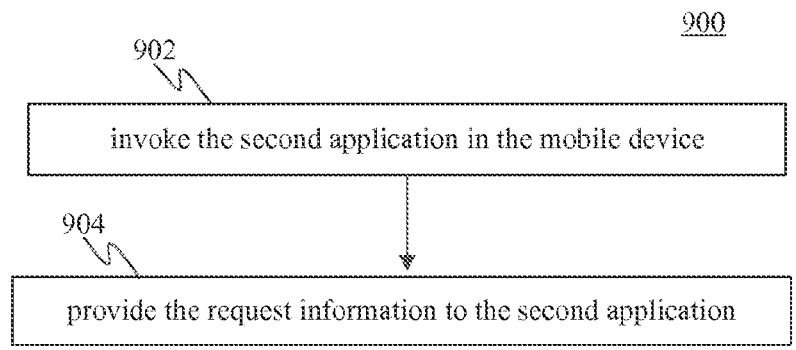
FIG. 9 shows a flowchart providing a process for invoking a callee application to process a call, according to an example embodiment.

Accordingly, FIG. 9 shows a flowchart 900 providing a process for invoking a callee application to process a call, according to an example embodiment. Further structural and operational embodiments will be apparent to persons skilled in the relevant art(s) based on the following description of flowchart 900.

Flowchart 900 begins with step 902. In step 902, the second application is invoked in the mobile device. In an embodiment, call broker 402 receives call 420, and determines that call 420 is directed to callee application 104. In response, broker process 402 may determine that callee application 104 is not executing and may invoke callee application 104, and/or may issue a request to a resource of operating system 404 to determine whether callee application 104 is executing and to request that callee application 104 be invoked. According to one of these techniques, or in any other suitable manner, callee application 104 may be invoked. As shown in FIG. 6, callee application 104 has been invoked and is residing in primary memory 406. In the embodiments of FIGS. 4 and 6, caller application 102 and callee application 104 do not reside in primary memory 406 simultaneously.

In step 904, the request information is provided to the second application. As shown in FIG. 6, call broker 412 provides request information 602 to callee application 104. For example, call broker 412 may provide request information 602 in the form of a uniform resource indicator (URI), a system call, and/or another form.

Figure 10:
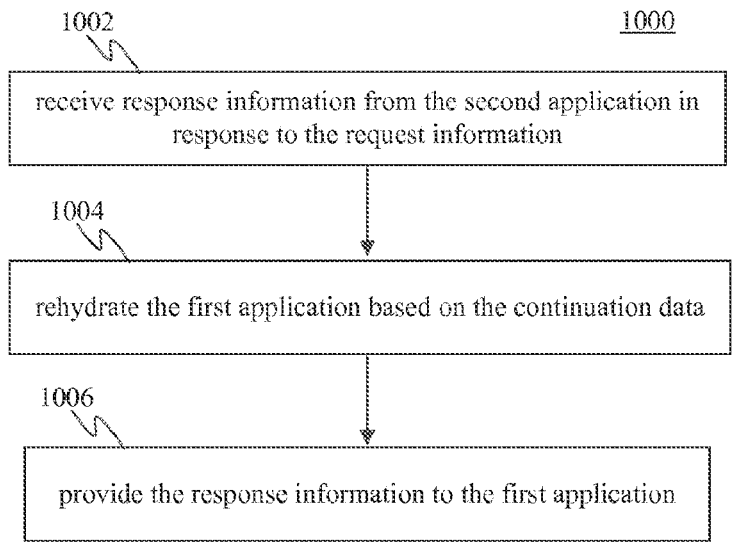
FIG. 10 shows a flowchart providing a process for rehydrating a caller application to complete a call, according to an example embodiment.
Figure 11:
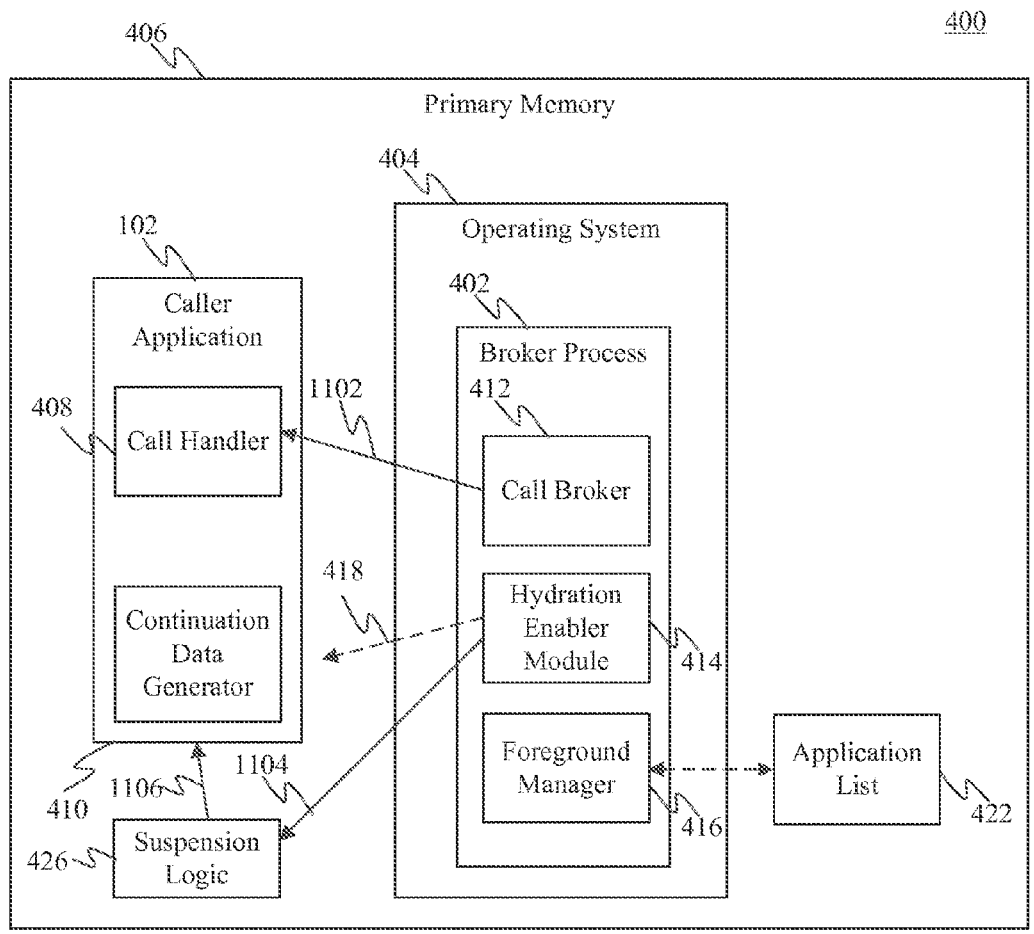
FIG. 11 shows the block diagram of the mobile device of FIG. 4 in which the caller application is rehydrated to complete the call, according to an example embodiment.

In an embodiment, flowchart 500 of FIG. 5 may continue as shown in FIG. 10 to finish processing of the call. FIG. 10 shows a flowchart 1000 providing a process for rehydrating a caller application to complete a call, according to an example embodiment. Further structural and operational embodiments will be apparent to persons skilled in the relevant art(s) based on the following description of flowchart 1000.

Flowchart 1000 begins with step 1002. In step 1002, response information is received from the second application in response to the request information. For example, as shown in FIG. 6, callee application 104 generates response information 604. Response information 604 is received by call broker 412. As described above, response information, e.g., response information 306 of FIG. 3, may include the requested file, requested information, return data, a completion acknowledgment, etc.

Figure 12:
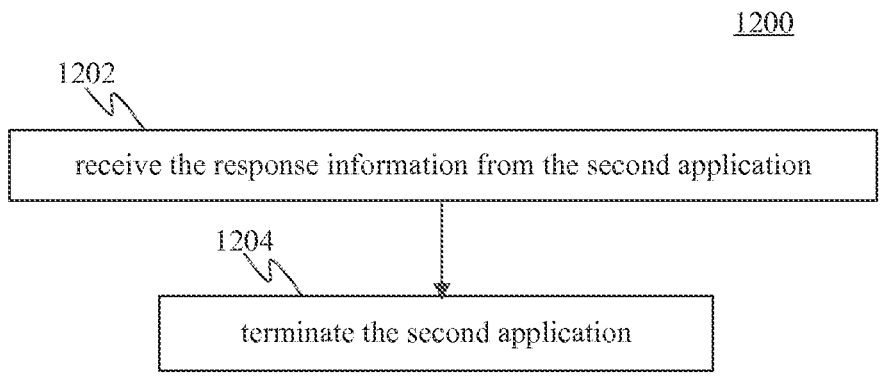
FIG. 12 shows a flowchart providing a process for terminating a callee application after responding to a call, according to an example embodiment.

Accordingly, in an embodiment, callee application 104 may no longer need to be executing and taking up space in primary memory 406. Accordingly, step 1002 in FIG. 10 may be performed as show in FIG. 12. FIG. 12 shows a flowchart 1200 providing a process for terminating a callee application after responding to a call, according to an example embodiment. Further structural and operational embodiments will be apparent to persons skilled in the relevant art(s) based on the following description of flowchart 1200.

Flowchart 1200 begins with step 1202. In step 1202, the response information is received from the second application. For instance, as described above, callee application 104 generates response information 604, which is received by call broker 412.

In step 1204, the second application is terminated. In an embodiment, after receiving response information 604, broker process 402 may determine that callee application 104 is no longer needed with respect to the received call. As such, broker process 402 may generate a shutdown signal (not shown in FIG. 6) that is received by callee application 104 directly, or that is received by another device resource that manages device resources, such as a memory manager, suspension logic 426 (FIG. 4), or other resource, and which in turn provides a shutdown instruction directly to callee application 104. Accordingly, callee application 104 may be caused to invoke a shutdown process by the shutdown signal received from broker process 402 or other resource. The shutdown process results in caller application 102 terminating execution. Furthermore, a memory manager may open up or free the memory space that was allocated to callee application 104 in primary memory 406 to be used by other applications and/or resources. Alternatively, if callee application 104 is determined to be in use by the user and/or other applications, callee application 104 may not be shutdown.

In step 1004 of flowchart 1000 in FIG. 10, the first application is rehydrated based on the continuation data. In an embodiment, upon receiving response information 604, hydration enabler module 414 may be configured to rehydrate caller application 102 so that caller application 102 can be provided with the response. Continuation data 418 previously received from caller application 102 in call 420 may be used by hydration enabler module 414 to rehydrate continuation application 102 at a particular entry point. Continuation data 418 may be located and retrieved in any manner.

Figure 13:
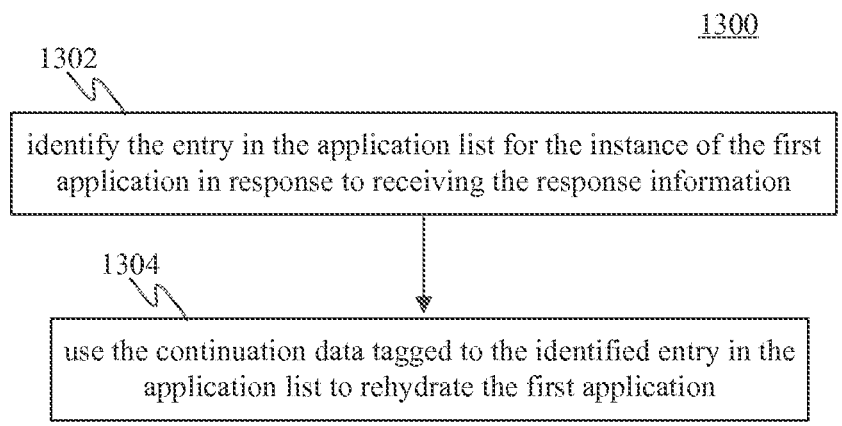
FIG. 13 shows a flowchart providing a process for locating continuation data for a first application using an application list, according to an example embodiment.

For example, in an embodiment, the process shown in FIG. 13 may be performed. FIG. 13 shows a flowchart 1300 providing a process for locating continuation data for a first application using an application list, according to an example embodiment. Further structural and operational embodiments will be apparent to persons skilled in the relevant art(s) based on the following description of flowchart 1300.

Flowchart 1300 begins with step 1302. In step 1302, the entry is identified in the application list for the instance of the first application in response to receiving the response information. For instance, in an embodiment, response information 604 received from caller application 102 may be correlated with call 420 and/or request information 602 to identify the instance of caller application 102 that issued call 420. In this manner, the entry in application list 422 for the identified instance of caller application 102 may be accessed to retrieve the associated continuation data 418.

In step 1304, the continuation data tagged to the identified entry in the application list is used to rehydrate the first application. In an embodiment, hydration enabler module 414 may use the retrieved continuation data 418 to rehydrate caller application 102. For instance, FIG. 11 shows the block diagram of mobile device 400 of FIG. 4, with caller application 102 having been rehydrated, according to an example embodiment. In an embodiment, and as shown in FIG. 11, hydration enabler module 414 may issue a rehydration request 1104, which is configured to cause caller application 102 to be rehydrated.

In one embodiment, rehydration request 1104 may be configured to directly cause caller application 102 to be invoked. In another embodiment, rehydration request 1104 may be directed to suspension logic 426. Suspension logic 426 may be configured to handle the rehydration of applications, such as caller application 102. For instance, as shown in FIG. 11, suspension logic 426 may generate a rehydration instruction 1106 that causes caller application 102 to be invoked. In either case, continuation data 418 is provided to caller application 102 to cause caller application 102 to continue operation at the entry point at which call 420 was issued.

For example, referring back to the social networking application example, continuation data 418 may identify a profile photo update entry point, a timeline update entry point, or other entry point for the social networking application. Accordingly, continuation data 418 may cause the social networking application to continue at the indicated entry point.

Figure 14:
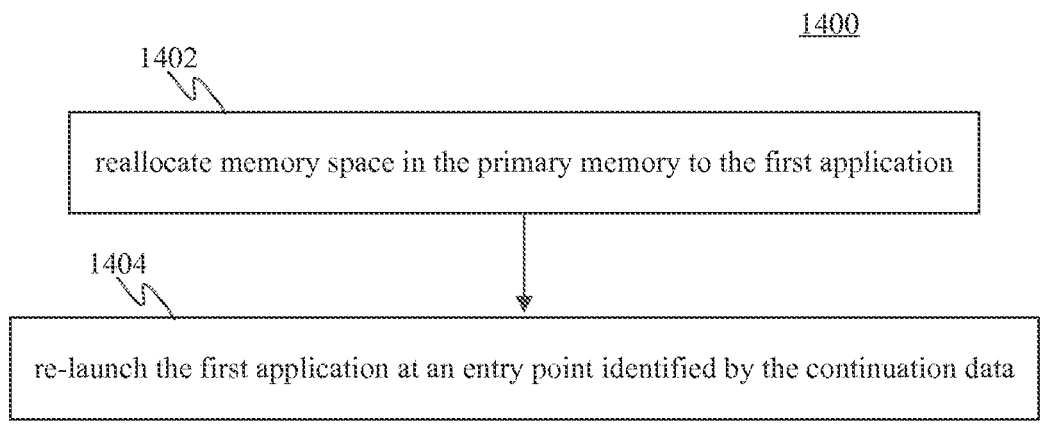
FIG. 14 shows a flowchart providing a process for rehydrating a caller application, according to an example embodiment.

Accordingly, step 1004 in FIG. 10 of rehydrating the first application may include the process shown in FIG. 14. FIG. 14 shows a flowchart 1400 providing a process for rehydrating a caller application, according to an example embodiment. Further structural and operational embodiments will be apparent to persons skilled in the relevant art(s) based on the following description of flowchart 1400.

Flowchart 1400 begins with step 1402. In step 1402, memory space is reallocated in the primary memory to the first application. In an embodiment, hydration enabler module 414 or suspension logic 426 may notify a memory manager (not shown in FIG. 11) of mobile device 400 to allocate memory space in primary memory 406 to the instance of caller application 102 to be invoked.

In step 1404, the first application is re-launched at an entry point identified by the continuation data. As described above, hydration enabler module 414 and/or suspension logic 426 may cause caller application 102 to be invoked.

Referring back to FIG. 10, in step 1006, the response information is provided to the first application. For example, as shown in FIG. 11, call broker 412 provides response information 1102 to call handler 408 of caller application 102. In response information 1102, call broker 412 forwards the response information included in response information 604 (FIG. 6) to caller application 102. In this manner, caller application 102 has access to the response information such as a file (e.g., a photo, a video, an audio file, etc.) or other object, generated information or return data, etc., which may be displayed or otherwise used by caller application 102. Furthermore, the response information is provided at the entry point of caller application 102 indicated by continuation data 418 (e.g., an updated profile photo, a new timeline photo, etc.).

It is noted that the description provided with respect to FIGS. 4-14 is provided with respect to first and second applications. With regard to the above described social networking application example, where a user attempts to select a photo to insert in their social networking profile or timeline, the first and second applications may be the social networking application (caller) and photo manager application (callee), where the social networking application calls for a photo from the photo manager application. Alternatively or additionally, the first and second applications may be the photo manager application (caller) and storage application (callee), where the photo manager application calls for a photo from the storage application. As such, embodiments are applicable to nested or chained scenarios, where a first application issues a call to a second application, which leads to the second application issuing a call to a third application, which leads to the third application potentially issuing a call to a fourth application, etc. Such nesting can include any number of nested caller-callee pairs.

Furthermore, note that FIGS. 4-14 are described in the context of a broker that acts as an intermediary between a caller application and a callee application. In other embodiments, another resource of a mobile device may operate as an intermediary between a caller application and a callee application in a similar manner as described according to FIGS. 4-14.

In the embodiments described above with respect to flowchart 1000 of FIG. 10, the caller application is dehydrated, response information is received from the callee application, and the caller application is rehydrated and provided with the response information. It is noted that in some cases, during processing of the call, a user may re-launch the dehydrated caller application before the response information is received. In such case, the call operation may be effectively canceled, and any response information may be discarded and/or ignored. Accordingly, the user may be enabled to proceed with interacting with the caller application without the call being completed.

For example, in an embodiment, an indication is received that a user interacted with a user interface of the mobile device to attempt to re-launch the first application. For instance, the user may have selected the application for execution, may have selected a "back" button, or may otherwise have re-launched the first application. The indication may be received prior to a response being received from the second application to the provided request information. As such, the first application may be re-launched at a main entry point (or the last entry point) for the first application rather than the entry point identified by the continuation data. The first application may be brought forward as the foreground application on the mobile device. Furthermore, the continuation data may be discarded.

Furthermore, in some other cases, the callee application may fail to respond to the call from the caller application. For instance, with respect to FIG. 6 and flowchart 1000 of FIG. 10, callee application 104 may not provide response information 604 to be received in step 1002. Many possible reasons exist for the callee application not responding, including the callee application crashing, the user "light dismissing" the second application using a back button, etc. In such a situation, the caller application may be rehydrated (step 1004 of flowchart 1000), the continuation data may be provided to the caller application, and broker process 402 may indicate to the caller application that the call was canceled (rather than performing step 1006 of flowchart 1000). For instance, in the example of the call being a request for one or more files from the callee application (a "file pick" operation), no files would be returned to the caller application.

III. Example Mobile and Stationary Device Embodiments

Mobile device 100, caller application 102, callee application 104, mobile device 300, intermediate entity 302, mobile device 400, broker process 402, operating system 404, call handler 408, continuation data generator 410, call broker 412, hydration enabler module 414, foreground manager 416, suspension logic 426, flowchart 200, flowchart 500, flowchart 700, flowchart 800, flowchart 900, flowchart 1000, flowchart 1200, flowchart 1300, and flowchart 1400 may be implemented in hardware, or hardware combined with one or both of software and/or firmware. For example, caller application 102, callee application 104, intermediate entity 302, broker process 402, operating system 404, call handler 408, continuation data generator 410, call broker 412, hydration enabler module 414, foreground manager 416, suspension logic 426, flowchart 200, flowchart 500, flowchart 700, flowchart 800, flowchart 900, flowchart 1000, flowchart 1200, flowchart 1300, and flowchart 1400 may be implemented as computer program code/instructions configured to be executed in one or more processors and stored in a computer readable storage medium. Mobile device 100, caller application 102, callee application 104, mobile device 300, intermediate entity 302, mobile device 400, broker process 402, operating system 404, call handler 408, continuation data generator 410, call broker 412, hydration enabler module 414, foreground manager 416, suspension logic 426, as well as one or more steps of flowchart 200, flowchart 500, flowchart 700, flowchart 800, flowchart 900, flowchart 1000, flowchart 1200, flowchart 1300, and flowchart 1400 may additionally and/or alternatively be implemented as hardware logic/electrical circuitry.

For instance, in an embodiment, one or more, in any combination, of caller application 102, callee application 104, intermediate entity 302, broker process 402, operating system 404, call handler 408, continuation data generator 410, call broker 412, hydration enabler module 414, foreground manager 416, suspension logic 426, flowchart 200, flowchart 500, flowchart 700, flowchart 800, flowchart 900, flowchart 1000, flowchart 1200, flowchart 1300, and/or flowchart 1400 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 15:
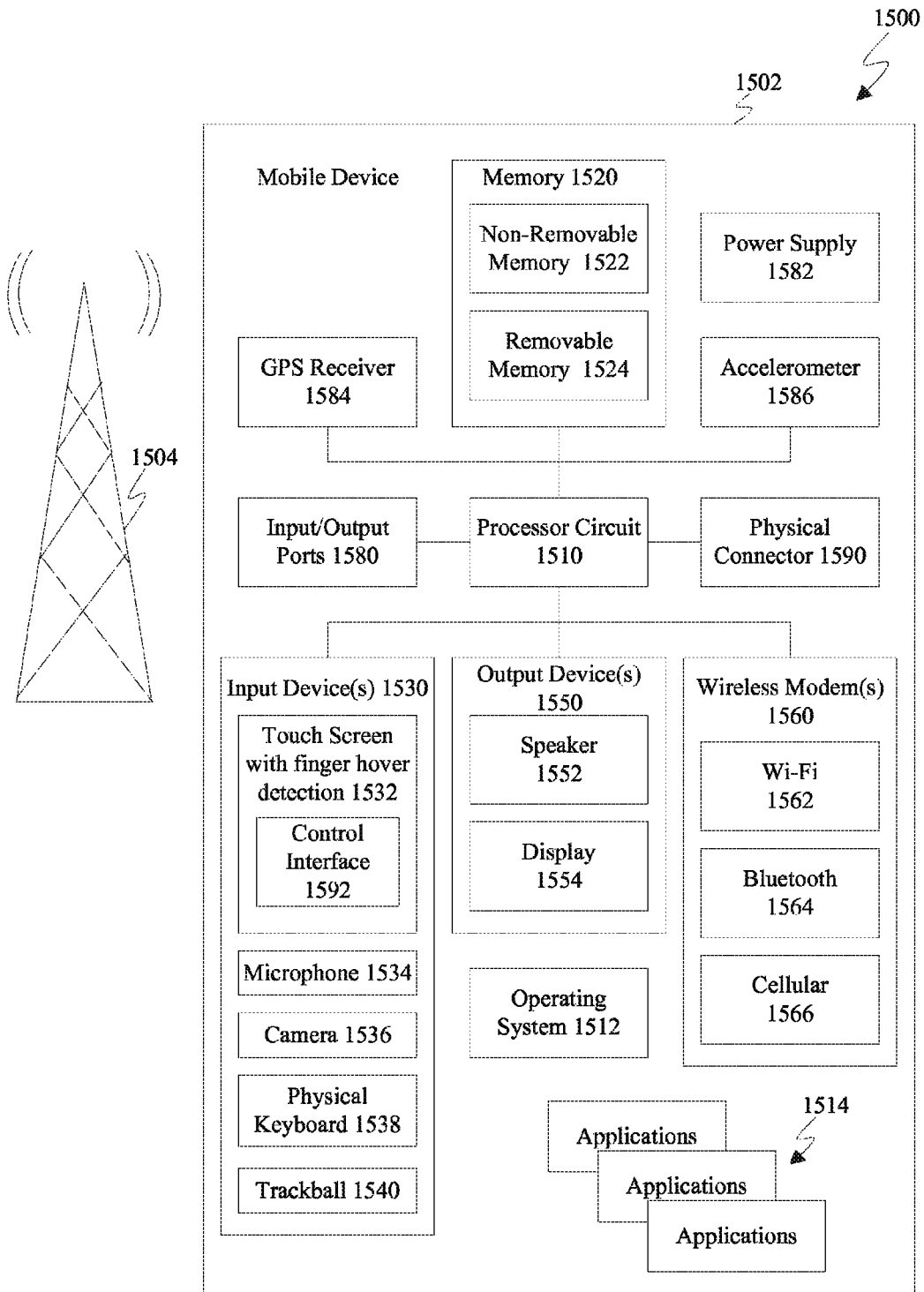
FIG. 15 shows a block diagram of an exemplary user device in which embodiments may be implemented.

FIG. 15 shows a block diagram of an exemplary mobile device 1500 including a variety of optional hardware and software components, shown generally as components 1502. For instance, components 1502 of mobile device 1500 are examples of components that may be included in mobile device 100, mobile device 300, and/or mobile device 400, in mobile device embodiments. Any number and combination of the features/elements of components 1502 may be included in a mobile device embodiment, as well as additional and/or alternative features/elements, as would be known to persons skilled in the relevant art(s). Such features/elements may also be included in stationary device embodiments. It is noted that any of components 1502 can communicate with any other of components 1502, although not all connections are shown, for ease of illustration. Mobile device 1500 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1504, such as a cellular or satellite network, or with a local area or wide area network.

The illustrated mobile device 1500 can include a controller or processor referred to as processor circuit 1510 for performing such tasks as signal coding, image processing, data processing, input/output processing, power control, and/or other functions. Processor circuit 1510 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1510 may execute program code stored in a computer readable medium, such as program code of one or more applications 1514, operating system 1512, any program code stored in memory 1520, etc. Operating system 1512 can control the allocation and usage of the components 1502 and support for one or more application programs 1514 (a.k.a. applications, "apps", etc.). Application programs 1514 can include common mobile computing applications (e.g., email applications, calendars, contact managers, web browsers, messaging applications) and any other computing applications (e.g., word processing applications, mapping applications, media player applications).

As illustrated, mobile device 1500 can include memory 1520. Memory 1520 can include non-removable memory 1522 and/or removable memory 1524. The non-removable memory 1522 can include RAM, read only memory (ROM), flash memory, a hard disk, or other well-known memory storage technologies. The removable memory 1524 can include flash memory or a Subscriber Identity Module (SIM) card, which is well known in Global System for Mobile (GSM) communication systems, or other well-known memory storage technologies, such as "smart cards." The memory 1520 can be used for storing data and/or code for running the operating system 1512 and the applications 1514. Example data can include web pages, text, images, sound files, video data, or other data sets to be sent to and/or received from one or more network servers or other devices via one or more wired or wireless networks. Memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1520. These programs include operating system 1512, one or more application programs 1514, and other program modules and program data. Examples of such application programs or program modules may include, for example, computer program logic (e.g., computer program code or instructions) for implementing caller application 102, callee application 104, intermediate entity 302, broker process 402, operating system 404, call handler 408, continuation data generator 410, call broker 412, hydration enabler module 414, foreground manager 416, suspension logic 426, flowchart 200, flowchart 500, flowchart 700, flowchart 800, flowchart 900, flowchart 1000, flowchart 1200, flowchart 1300, and/or flowchart 1400 (including any suitable step of flowcharts 200, 500, 700, 900, 1000, 1200, 1300, and 1400), and/or further embodiments described herein.

Mobile device 1500 can support one or more input devices 1530, such as a touch screen 1532, microphone 1534, camera 1536, physical keyboard 1538 and/or trackball 1540 and one or more output devices 1550, such as a speaker 1552 and a display 1554. Touch screens, such as touch screen 1532, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1532 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches or between 0.75 inches and 1 inch, or between 1 inch and 1.5 inches, etc.

The touch screen 1532 is shown to include a control interface 1592 for illustrative purposes. The control interface 1592 is configured to control content associated with a virtual element that is displayed on the touch screen 1532. In an example embodiment, the control interface 1592 is configured to control content that is provided by one or more of applications 1514. For instance, when a user of the mobile device 1500 utilizes an application, the control interface 1592 may be presented to the user on touch screen 1532 to enable the user to access controls that control such content. Presentation of the control interface 1592 may be based on (e.g., triggered by) detection of a motion within a designated distance from the touch screen 1532 or absence of such motion. Example embodiments for causing a control interface (e.g., control interface 1592) to be presented on a touch screen (e.g., touch screen 1532) based on a motion or absence thereof are described in greater detail below.

Other possible output devices (not shown) can include piezoelectric or other haptic output devices. Some devices can serve more than one input/output function. For example, touch screen 1532 and display 1554 can be combined in a single input/output device. The input devices 1530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electroencephalogram (EEG) and related methods). Thus, in one specific example, the operating system 1512 or applications 1514 can comprise speech-recognition software as part of a voice control interface that allows a user to operate the device 1500 via voice commands. Further, device 1500 can comprise input devices and software that allows for user interaction via a user's spatial gestures, such as detecting and interpreting gestures to provide input to a gaming application.

Wireless modem(s) 1560 can be coupled to antenna(s) (not shown) and can support two-way communications between processor circuit 1510 and external devices, as is well understood in the art. The modem(s) 1560 are shown generically and can include a cellular modem 1566 for communicating with the mobile communication network 1504 and/or other radio-based modems (e.g., Bluetooth® 1564 and/or Wi-Fi® 1562). Cellular modem 1566 may be configured to enable phone calls (and optionally transmit data) according to any suitable communication standard or technology, such as GSM®, 3G, 4G, 5G, etc. At least one of the wireless modem(s) 1560 is typically configured for communication with one or more cellular networks, such as a GSM® network for data and voice communications within a single cellular network, between cellular networks, or between the mobile device and a public switched telephone network (PSTN).

Mobile device 1500 can further include at least one input/output port 1580, a power supply 1582, a satellite navigation system receiver 1584, such as a Global Positioning System (GPS) receiver, an accelerometer 1586, and/or a physical connector 1590, which can be a USB port, IEEE 1394 (FireWire®) port, and/or RS-232 port. The illustrated components 1502 are not required or all-inclusive, as any components may be not present and other components may be additionally present as would be recognized by one skilled in the art.

As used herein, the terms "computer program medium," "computer-readable medium," and "computer-readable storage medium" are used to generally refer to physical hardware media such as the hard disk associated with a hard disk drive, removable magnetic disk, removable optical disk, other physical hardware media such as RAMs, ROMs, flash memory cards, digital video disks, zip disks, microelectromechanical systems (MEMO, nanotechnology-based storage devices, and further types of physical/tangible hardware storage media (including memory 1520 of FIG. 15). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, radio frequency (RF), infrared and other wireless media, as well as wired media. Embodiments are also directed to such communication media.

As noted above, computer programs and modules (including applications 1514 of FIG. 15) may be stored on a hard disk, magnetic disk, optical disk, ROM, RAM, or other hardware storage medium. Such computer programs may also be received via the network interface(s) of wireless modem 1560, physical connector 1590, or any other interface type. Such computer programs, when executed or loaded by an application, enable mobile device 1502 to implement features of embodiments discussed herein. Accordingly, such computer programs represent controllers of mobile device 1502.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a mobile device, comprising:
receiving a call issued from a first application stored in a memory of the mobile device that is directed to a second application, the call including continuation data for the first application and request information;
dehydrating the first application, dehydrating including terminating execution of an instance of the first application, and freeing memory space in the memory of the mobile device that was allocated to the instance of the first application; and
providing the request information to the second application.

2. The method of claim 1, further comprising:
receiving response information from the second application in response to the request information;
rehydrating the first application based on the continuation data; and
providing the response information to the first application.

3. The method of claim 2, wherein said providing the request information to the second application comprises:
invoking the second application in the mobile device; and
providing the request information to the invoked second application; and
wherein said receiving response information from the second application in response to the request information comprises:
receiving the response information from the invoked second application; and
terminating the invoked second application.

4. The method of claim 2, wherein the memory of the mobile device is a primary memory of the mobile device.

5. The method of claim 2, wherein said rehydrating comprises:
reallocating memory space in the primary memory to the first application; and
re-launching the first application at an entry point identified by the continuation data.

6. The method of claim 2, further comprising:
maintaining an application list that includes one or more entries, each entry of the application list indicating an application identifier for a corresponding application and an application instance identifier that identifies a particular instance of the corresponding application; and
in response to receiving the call issued by the first application, tagging an entry in the application list with the continuation data, the tagged entry corresponding to the instance of the first application that issued the call.

7. The method of claim 6, wherein said rehydrating the first application based on the continuation data comprises:
identifying the entry in the application list for the instance of the first application in response to receiving the response information; and
using the continuation data tagged to the identified entry in the application list to rehydrate the first application.

8. The method of claim 1, further comprising:
receiving an indication that a user interacted with a user interface of the mobile device to attempt to re-launch the first application, the indication received prior to a response being received from the second application to the provided request information;
re-launching the first application at a main entry point for the first application rather than another entry point identified by the continuation data; and
discarding the continuation data.

9. A computer-readable storage medium comprising computer-executable instructions that, when executed by a processor, perform a method in a mobile device comprising:
receiving a call issued from a first application stored in a memory of the mobile device that is directed to a second application, the call including continuation data for the first application and request information;
dehydrating the first application, dehydrating including terminating execution of an instance of the first application, and freeing memory space in the memory of the mobile device that was allocated to the instance of the first application;
providing the request information to the second application;

receiving response information from the second application in response to the request information;
rehydrating the first application based on the continuation data; and
providing the response information to the first application.

10. The computer-readable storage medium of claim 9, wherein said providing the request information to the second application comprises:
invoking the second application in the mobile device; and
providing the request information to the invoked second application; and
wherein said receiving response information from the second application in response to the request information comprises:
receiving the response information from the invoked second application; and
terminating the invoked second application.

11. The computer-readable storage medium of claim 9, wherein the memory of the mobile device is a primary memory of the mobile device.

12. The computer-readable storage medium of claim 9, wherein said rehydrating comprises:
reallocating memory space in the primary memory to the first application; and
re-launching the first application at an entry point identified by the continuation data.

13. The computer-readable storage medium of claim 9, wherein the method further comprises:
maintaining an application list that includes one or more entries, each entry of the application list indicating an application identifier for a corresponding application and an application instance identifier that identifies a particular instance of the corresponding application; and
in response to receiving the call issued from the first application, tagging an entry in the application list with the continuation data, the tagged entry corresponding to the instance of the first application that issued the call.

14. The computer-readable storage medium of claim 13, wherein said rehydrating the first application based on the continuation data comprises:
identifying the entry in the application list for the instance of the first application in response to receiving the response information; and
using the continuation data tagged to the identified entry in the application list to rehydrate the first application.

15. A system in a mobile device, comprising:
a primary memory configured to allocate memory space for applications;
at least one processor circuit; and
a broker process configured to execute in the processor circuit of the mobile device, the broker process including:
a call broker configured to receive a call issued from an instance of a first application that executes in the mobile device, the call directed to a second application and including continuation data for the instance of the first application and request information, the call broker further configured to provide the request information to the second application without the continuation data; and
a hydration enabler module configured to provide a first signal to enable the instance of the first application to be dehydrated, dehydrating including terminating execution of the instance of the first application, and freeing the memory space of the primary memory that was allocated to the instance of the first application;
the call broker further configured to receive response information from the second application in response to the request information;
the hydration enabler module configured to cause the instance of the first application to be rehydrated based on the continuation data; and
the call broker further configured to provide the response information to the instance of the first application.

16. The system of claim 15, wherein the call broker is further configured to cause the second application to be invoked in the mobile device, and to provide the request information to the invoked second application; and
the call broker is configured to cause the invoked second application to be terminated in response to receipt of the response information from the invoked second application.

17. The system of claim 16, wherein the memory space of the primary memory that was allocated to the invoked second application is freed subsequent to the terminating of the invoked second application.

18. The system of claim 17, wherein memory space in the primary memory is reallocated to the instance of the first application and the first application is re-launched at an entry point identified by the continuation data when the instance of the first application is rehydrated based on the continuation data.

19. The system of claim 15, further comprising:
a foreground manager configured to maintain an application list that includes one or more entries, each entry of the application list indicating an application identifier for a corresponding application and an application instance identifier that identifies a particular instance of the corresponding application; and
wherein the call broker is configured to tag an entry in the application list with the continuation data in response to receiving the call issued by the first application, the tagged entry corresponding to the instance of the first application that issued the call.

20. The system of claim 19, wherein the call broker is configured to identify the entry in the application list for the instance of the first application in response to receiving the response information, and to use the continuation data tagged to the identified entry in the application list to rehydrate the first application.

* * * * *